Patented Feb. 4, 1941

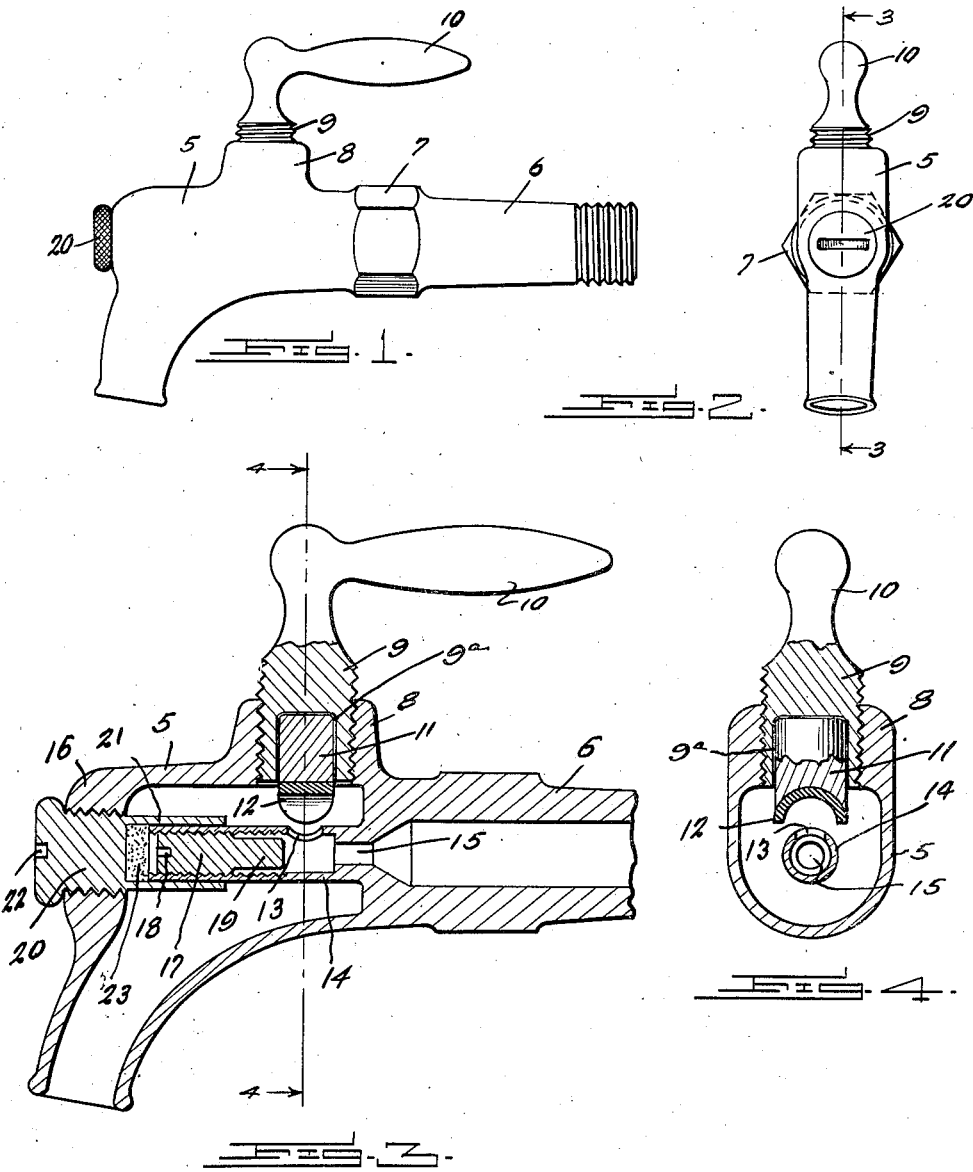

2,230,323

UNITED STATES PATENT OFFICE 2,230,323

FAUCET

Raymond E. Guyton, Ontario, Calif., assignor of twenty-five per cent to Jackson Turner, Hollywood, Calif., twenty-five per cent to Edward B. Darrah, Redlands, Calif., twenty-five per cent to Albert E. French, Pomona, Calif., and seven per cent to John Carr, and one per cent to Joy L. Bradley, both of Ontario, Calif., and four per cent to Lyston A. Weatherly, Riverside, Calif.

Application February 15, 1940, Serial No. 319,142

2 Claims. (Cl. 277—67)

This invention appertains to new and useful improvements in the general art of valves and more particularly to a faucet having water cutoff means independent of the usual control valve, thus alleviating the necessity of cutting off the entire house water system when repairs are necessary to a faucet.

An important object of the invention is to provide a faucet having independent water cut-off means, which does not complicate the faucet construction and which does not take away its conventional appearance.

Another important object of the invention is to provide a faucet having a cut-off independent of the usual valve which is of simple construction and easy to control.

These and other important objects and advantages of the invention will become apparent to the reader of the following description.

In the drawing:

Figure 1 represents a side elevational view.

Figure 2 is a front elevation.

Figure 3 is a section on the line 3—3 of Figure 2.

Figure 4 is a cross section on the line 4—4 of Figure 3.

Referring to the drawing wherein like numerals designate like parts, it can be seen that numeral 5 represents the body or shell of the faucet which has the threaded extension 6 for connection to the usual pipe line (not shown). Numeral 7 represents the usual wrench-engageable polygonal formation.

A riser 8 on the top of the body 5 has a vertically threaded bore therethrough for receiving the threaded plug 9 which is feedable in the bore of the riser 8 by the laterally disposed handle 10.

The lower portion of the plug 9 has the smooth cylindrical bore 10 in which the cylindrical body 11 is disposed and on which the plug 9 is capable of rotating. This cylindrical element 11 represents the valve element, the same having a concaved bottom portion in which is disposed the packing element 12 which will engage over the opening 13 in the water outlet tube 14 when the plug 9 is screwed downwardly. The tubular extension 6 is in communication with the tube 14 by way of the passageway 15, the tube 14 being in alignment with the axis of the extension 6. The tube 14 terminates slightly rear of the thickened front portion 16 of the body 5 and is internally threaded to receive the elongated plug 17 having a screw-driver kerf 18 at its outer end. This valve element 17 has a reduced portion 19 which is engageable against one end of the passageway 15 to cut off the water supply to the opening 13 independently of the valve element 11.

Numeral 20 denotes a valve having the hollow skirt-like portion 21 extending therefrom and telescoping the forward end of the tube 14. This plug 20 is threadedly disposed through the thickened front portion 16 of the body 5 and has a screw-driver receiving kerf 22 in its head portion.

A packing material 23 is disposed in the skirt 21 forwardly of the valve element 17.

It can now be seen, that in the event the valve structure 11, 12 become defective, the plug 20 can be removed, and a screw-driver engaged with the valve element 17 to the end that the valve element 17 can be driven inwardly to close off the passageway 15, thus permitting the valve 11, 12 to be repaired without shutting off the entire water system.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a faucet, a body, a dispensing tube in the body having an opening therein, a hand valve operative to open or close the opening of the tube, and a valve operative in the tube to shut off the said opening of the tube, said body having a removable plug permitting access to the valve element in the tube, said plug having a skirt-like portion adapted to telescope the adjacent end of the tube.

2. In a faucet, a body, a dispensing tube in the body having an opening therein, a hand valve operative to open or close the opening of the tube, a valve operative in the tube to shut off the said opening of the tube, a telescopic element feedable into the body and provided with a plug-like head, said telescopic element having a packing element therein for interposition between the plug-like head and the adjacent end of the tube, said telescopic element being adapted to telescope the last-mentioned end of the tube.

RAYMOND E. GUYTON.